July 5, 1955

J. E. DUNCAN 2,712,371

MAGNETIC FLUID CLUTCH MECHANISM

Filed April 2, 1949

INVENTOR
JOHN E. DUNCAN
BY
Beau, Brooks, Buckley & Beau,
ATTORNEYS.

July 5, 1955  J. E. DUNCAN  2,712,371
MAGNETIC FLUID CLUTCH MECHANISM
Filed April 2, 1949  2 Sheets-Sheet 2
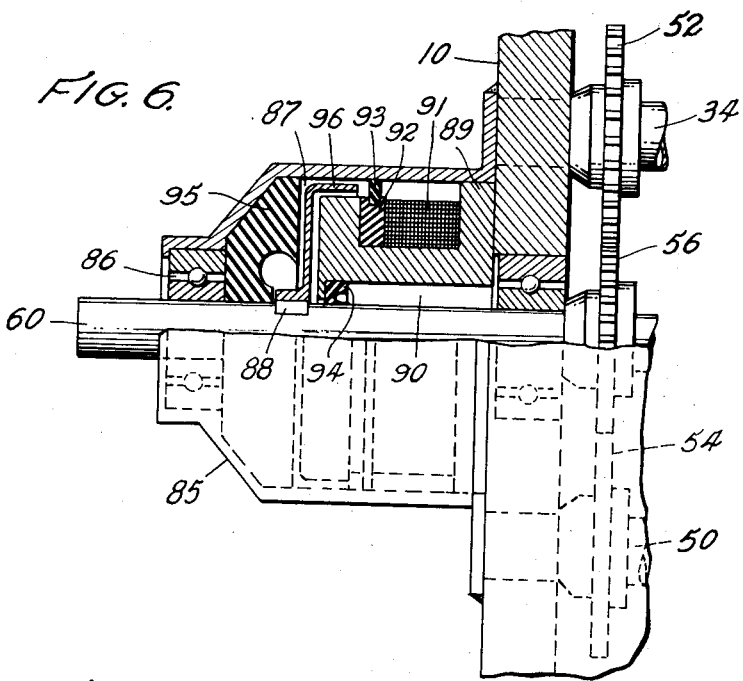
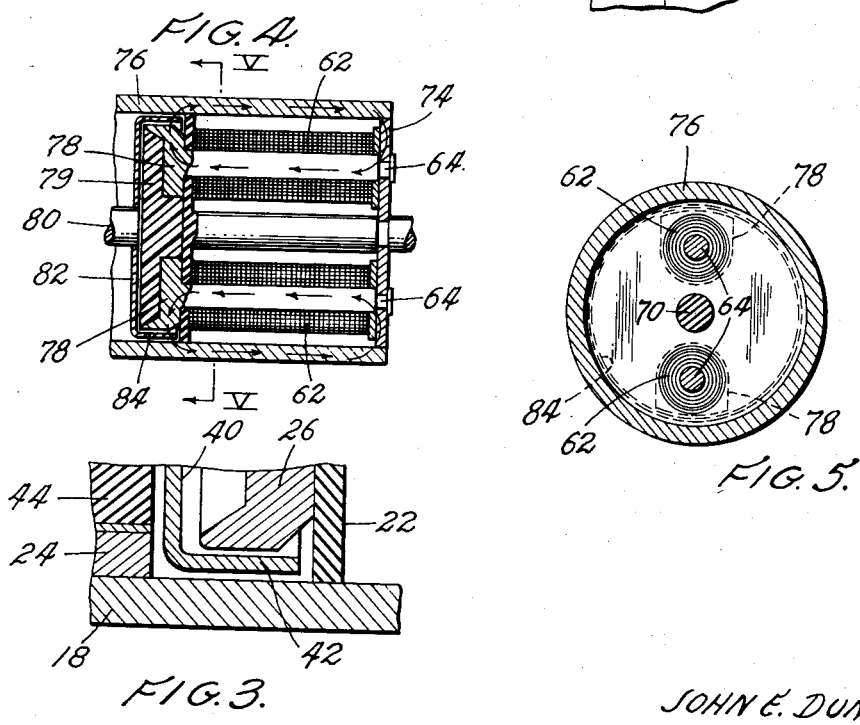
INVENTOR
JOHN E. DUNCAN
BY
Beau, Brooke, Buckley & Beau
ATTORNEYS.

United States Patent Office 2,712,371
Patented July 5, 1955

2,712,371

MAGNETIC FLUID CLUTCH MECHANISM

John E. Duncan, Buffalo, N. Y., assignor to Duncan & Bayley, Inc., Buffalo, N. Y.

Application April 2, 1949, Serial No. 85,147

3 Claims. (Cl. 192—21.5)

This invention relates to improvements in electromagnetic clutch devices, and more particularly to clutches of the so-called fluid-magnetic type.

One of the objects of the invention is to provide an improved clutch device which responds with maximum rapidity to control effects impressed thereon.

Another object of the present invention is to provide an improved clutch device of the type wherein the rate of response to control effects thereon is a function of the amount of current applied thereto.

Another object of the invention is to provide an improved clutch device of the character aforesaid wherein the driven member is of minimum inertia.

Another object of the invention is to provide in a fluid-magnetic type clutch an improved construction wherein the electro-magnetic coil device is isolated from the fluid element of the mechanism.

Another object of the invention is to provide an improved fluid-magnetic clutch mechanism which is of minimum fluid drag under deenergized condition.

Another object of the invention is to provide an improved fluid magnetic type clutch mechanism which is responsive to minimum controlling current.

Another object of the invention is to provide an improved fluid-magnetic clutch mechanism.

Other objects and advantages of the present invention will appear from the specification hereinafter.

In the drawing:

Fig. 3 is an enlarged detail of Fig. 1;

Fig. 4 is a fragmentary sectional view corresponding to a portion of Fig. 1, but showing a modified form of electromagnetic coil arrangement;

Fig. 5 is a section taken along line V—V of Fig. 4; and

Fig. 6 is a sectional elevation of a holding brake mechanism useable with the invention.

Figure 1:
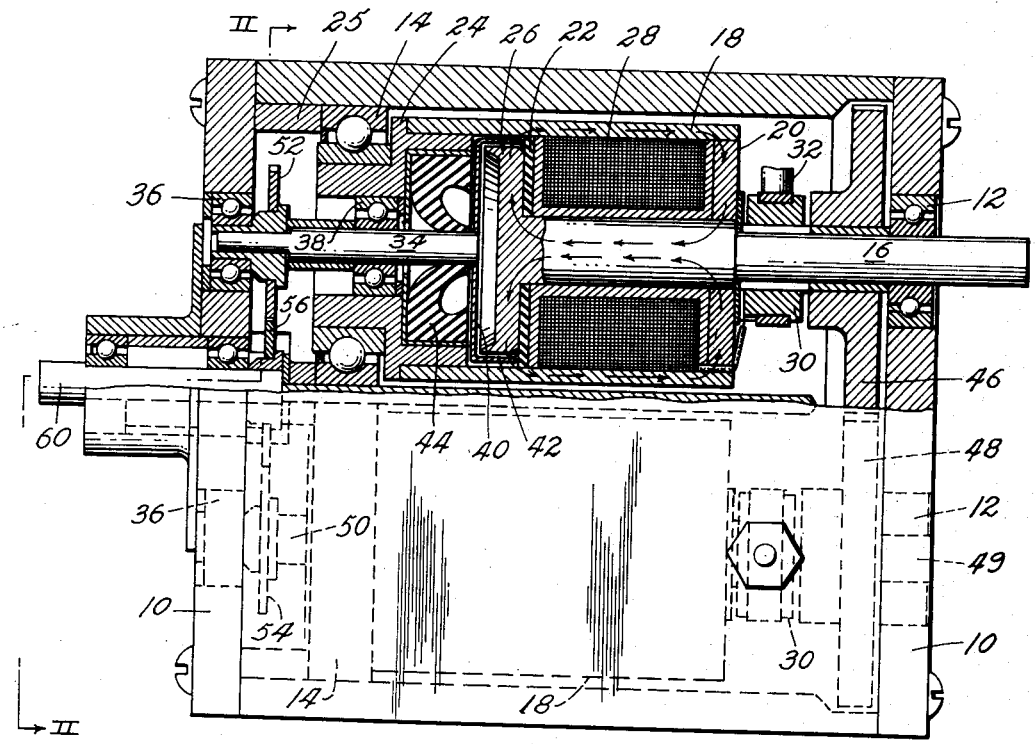
Fig. 1 is a sectional elevation of a clutch mechanism embodying the invention.
Figure 2:
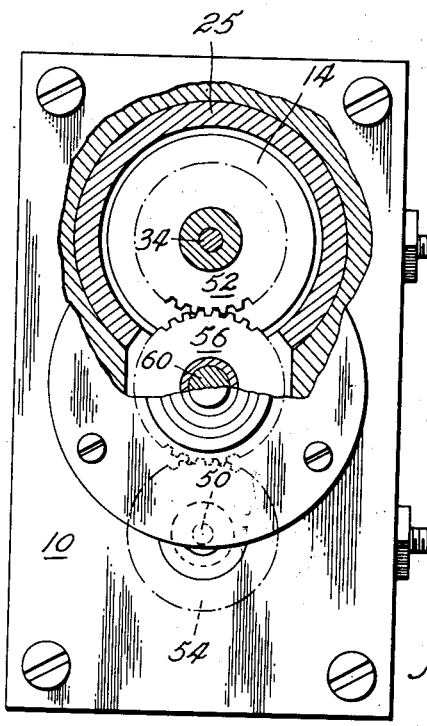
Fig. 2 is a section-elevation taken along line II—II of Fig. 1.

The invention is illustrated in Figs. 1–3 inclusive as being embodied in a reversing clutch mechanism comprising a pair of clutch devices mounted within a single case and adapted to be driven by a common power input shaft. The output shaft is in turn connected by means of a gear train to the driven elements of the clutch mechanisms, and the power input shaft is arranged in conjunction with a gear system so that the clutch devices operate in opposite directions. Thus, when one of the clutch devices is engaged the torque supplied to the input shaft is transmitted through the mechanism to drive the output shaft in a certain direction, while when the other clutch device is engaged the output shaft will be driven in the opposite direction. However, it will be understood of course that the invention is not limited to such a "reversing" clutch arrangement, and that the features thereof are equally applicable to employment in conjunction with uni-directional clutch mechanisms.

Referring now specifically to Figs. 1–3 of the drawing, the mechanism is illustrated to be housed within a casing designated generally at 10. In the drawing the casing is of box-like form, but it will be understood that it may be of any other suitable shape and fabricated of any suitable materials, as may be preferred. The casing 10 carries a pair of bearings 12—14 which rotatably support the power input shaft 16 and a clutch cage device which is formed integral therewith to rotate as a unit about the axis of the input shaft. The cage structure comprises a cylindrical sleeve 18 which is mounted concentrically of the shaft 16 by means of circular plates 20—22. An adapter 24 which extends from integral connection with the cage sleeve 18 is journalled within the bearing 14, whereby the input shaft and the cage and the adapter assembly are mounted within the bearings 12—14 so as to be freely rotatable therein. A bearing spacer 25 is disposed between the bearing 14 and the end wall of the casing 10.

The inner end of the input shaft 16 is provided with a driving disc 26 which is of slightly less diameter than the bore of the sleeve 18 and which may be integral with the shaft or fabricated and keyed thereon in any suitable manner. In any case the input shaft 16, the end plate 20, the cage sleeve 18, and the disc 26 are all formed of magnetic material, such as for example any suitable ferrous or non-ferrous metal or alloy or the like. The plate 22, however, is formed of non-magnetic material, and is suitably sealed into integral connection between the sleeve 18 and the shaft 16 and the chamber thus provided within the sleeve and between the plates 20—22 houses an electro-magnetic coil 28. The leads from the coil 28 connect to a suitable slip-ring designated 30 which is carried by the shaft 16 for engagement with a brush 32 for supply of power to the coil 28 from any suitably controlled source.

A power take-off shaft 34 is rotatably mounted by means of bearings 36–38 so as to be disposed axially with the input shaft 16, and the shaft 34 carries at its inner end and integrally therewith a cup-shaped rotor member 40, the flange portion 42 of which is disposed within the gap between the periphery of the disc 26 and the inner wall of the sleeve 18. An annular seal as indicated at 44 is disposed within the chamber provided between the adapter 24 and the take-off shaft 34 to complete the sealing of the clutch chamber in which the disc 26 and the rotor 40 rotate; said chamber being defined by the shaft 34, the oil seal 44, the adapter 24, the sleeve 18, the plate 22, the disc 26 and the inner end of the input shaft 16. It is a particular feature of the arrangement that the flange 42 of the member 40 is substantially coextensive (axially of the clutch mechanism) with the peripheral face of the member 26. A suitable mixture of a fluid such as oil or grease or the like and comminuted magnetic material such as iron filings or the like is disposed within the clutch chamber as defined hereinabove, and is supplied in such quantity that it will fill the gap or substantial portions thereof between the members 26—42 when the parts are rotating. In this respect it will be noted that the flange portion 42 of the cup member 40 is disposed within a gap defined at opposite sides by the sleeve 18 and the disc member 26, whereby the flange portion 42 is enclosed at both sides thereof by the oil and magnetic particle mixture.

It is presently known that in a clutch device of this general type, whenever such mixture of fluid and magnetic particles is magnetized, as by energization of the coil 28 of Fig. 1, the solid particles magnetically interlock and thereby stiffen the mixture and magnetically bond the members 26—42 together. Thus, the degree of clutching action will depend upon the degree of energization of the coil 28, and the corresponding degree of magnetization of the clutch mixture, and a variable slippage clutch is thereby provided wherein the degree of slip is a function of the degree of magnetization of the driving parts.

It is a particular feature of the present invention, however, that the coil and rotor arrangement thereof focuses the magnetizing action in a region of shortest possible length axially of the rotor system; the flux being provided to flow radially, as illustrated by the directional arrows in the drawing, through a single air gap axially of the rotor system between the members 18—26 which is occupied by the flange portion 42 of the rotor member (see Figs. 1 and 3). A further focusing of the flux lines is accomplished by constructing the member 22 to be of a non-magnetic material and so disposed as to create a flux barrier which is of greater reluctance than that of the adjacent work area. Even though the rotor cage assembly be fabricated of several parts for ease of manufacture as illustrated in the drawing, there is no other major air gap in the flux path; and thus practically the entire magnetic power is delivered to the air gap in the region of the flange 42. Thus, all of this power may be utilized at the single gap by means of an extremely short (axially of the rotor system) and light-weight take-off rotor 40; and the entire driven rotor device may be constructed and arranged to be of minimum inertia. Hence, the output shaft is adapted to be clutched into engagement with the input shaft with improved rapidity compared to other clutch arrangements employing the fluid-magnetic principle, such as for example clutches employing plural gaps in the flux path relatively spaced in the direction of the driving axis. The rim of the disc 26 is preferably shaped so as to avoid imposition of any axial force upon the rotor 40 such as would cause undesirable drag in the parts. For example, as shown in Figs. 1 and 3, the rim of the driver 26 may be offset slightly so that the lateral components of the magnetic forces between the members 26 and 42 are approximately balanced.

As explained hereinabove, the drawing shows at Fig. 1 a reversing clutch mechanism, and to this end the input shaft 16 is illustrated to mount a spur gear 46 which meshes with a similar spur gear 48 carried by a secondary input shaft 49. The shaft 49 comprises the input shaft of the second clutch device and mounts within the casing (not shown) a cage and coil unit as in the manner of the first clutch unit illustrated and described hereinabove. Similarly, the unit of the input shaft 49 is arranged to clutch into connection with a take-off shaft 50 which corresponds to the take-off shaft 34 of the first clutch unit. The take-off shafts 34 and 50 each mount spur gears 52—54, respectively, both of which mesh with a spur gear 56 carried by the power out-put shaft 60 of the entire mechanism.

Thus, it will be apparent that because of the gear train arrangement 46—48 the input shaft 49 will rotate continuously with the input shaft 16, but in the opposite direction, and that the direction of rotation of the output shaft 60 will depend upon which one of the clutch devices is in engagement at any given time. The magnetic coil devices of the clutch mechanisms are selectively controlled by any suitable manual or automatic control mechanism so as to alternately engage and disengage the clutch devices of the unit so that the output shaft 60 will be driven in either direction or will be completely disengaged from the power input shaft, as may be desired. However, as explained hereinabove it will be understood that the invention is not limited to use in a reversing clutch unit, and that the features thereof are equally applicable to single clutch devices, and to various other mechanisms. For example, another application is in connection with so-called clutch-and-brake units; and in such case it will be understood that the shaft 49 referred to hereinabove may be simply locked in relation to the casing 10 (the spur gear 48 having been previously removed) whereupon connection of the output shaft 60 to a moving load and energization of the clutch device of the shaft 49 will cause the load to be braked through the mechanism including the shaft 50. Still another application for example would be in a reverse direction gear having a pair of fluid-magnetic clutches as explained hereinabove and a third fluid-magnetic device in which the "driver member" is permanently locked to a stationary support; whereby the two "clutch" members may be alternately energized for reverse direction of power outputs and the third device may be energized to operate as a holding brake to lock the output shaft when neither output "clutch" is energized.

This last-mentioned application is illustrated in Fig. 6, as comprising a housing 85 of magnetic material secured to the end wall of casing 10 as by welding. Output shaft 60 extends through said housing 85, being journalled in bearings 86, and a cup-shaped driven rotor 87, similar to rotors 40 and 82, is keyed or otherwise secured to output shaft 60 at 88. A cylindrical member 89, formed of a magnetic material, is secured to housing 85, and has an aperture 90 therethrough through which extends output shaft 60. An electromagnetic coil 91 is secured around member 89, with a plate 92 of non-magnetic material placed between coil 91 and the forward end of member 89 to form a flux barrier. Sealing means 93 and 94 extend between spacing element 92 and housing 85, and between member 89 and output shaft 60, and a sealing means 95 extends between housing 85 and output shaft 60, all in the manner shown, whereby to form a chamber containing one end of member 89 and rotor 87. This chamber is filled with a mixture of fluid and magnetic particles, whereby whenever coil 91 is energized, rotor 87 will "engage" member 89 to lock or otherwise brake output shaft 60 against further rotation. It will be noted that rotor 87 has an axially extending peripheral flange 96 which extends into the gap between the forward edge of member 89 and housing 85, and the magnetic flux is intended to flow radially across this annular gap, traveling through member 89 and housing 85, in a manner similar to the arrangement shown in Figs. 1 and 4.

Modified forms of magnetic coil arrangements may be provided to comprise pluralities of coils instead of the single coil of Fig. 1; and for example as shown in Figs. 4–5 a pair of coils 62 wound upon cores 64 may be arranged about an input shaft axis 70 which corresponds to the input shafts 16—49 of Fig. 1; so as to obtain improved control in return for input of a reduced amount of controlling current. In any case such arrangements would be provided to obtain concentration of flux lines at one position axially of the rotor device; the flux lines being directed radially through the rotor gap region; and such applications are particularly useful for example wherever it is inconvenient to use large controlling power in the clutch control coil system.

As illustrated specifically in Figs. 4 and 5 of the drawing, the shaft 70 is formed of non-magnetic material and carries integrally therewith a circular bulkhead device comprising plates 72 and 74 which carry the outer sleeve 76 so as to provide a rotating cage-like structure, generally similar to that of Fig. 1. The plate 72 is formed of non-magnetic material while the sleeve 76 and the back plate 74 are each formed of magnetic material. Each of the coil cores 64 extend through suitably apertured portions of the circular plate 72 and terminate in magnetic head pieces 78. Plastic material or the like may be filled into the face of the disc formed by magnetic head pieces 78 as indicated at 79 to provide a flush face for the driving rotor. The output shaft is indicated at 80 and mounts a driven rotor member 82 which includes a flange portion 84 corresponding to the flange 42 of the driven rotor 40 of Fig. 1. Thus, it will be appreciated that Figs. 4 and 5 show another form of coil arrangement which provides the same features referred to hereinabove in connection with Fig. 1, but in addition provides improved control in return for input of lesser amounts of control current.

It is of course a characteristic of all fluid-magnetic clutches that some amount of torque will continue to be transmitted to the driven member from the driver after the controlling power has been removed. This is caused by reason of the contact of the driven member with the magnetic fluid which in turn is in contact with the rotating driver; the magnitude of the torque being a function of the difference in rotational speed between the driving and the driven members; the amount of residual magnetism; and the viscosity of the fluid; the most important factor being the driven member area in contact with the fluid. It is a particular feature of the present invention however that the coil and rotor arrangements thereof focus the magnetizing action in a region of shortest possible length axially of the rotor system, thereby providing a minimum amount of contact area between the driven member and the magnetic fluid. This feature results in a substantial decrease in residual torque output when the controlling power has been removed, compared to prior designs.

It will be of course understood that although only a few forms of the invention have been shown and described in detail, it will be apparent to those skilled in the art that the invention is not so limited but that various changes may be made therein without departing from the spirit of the invention or the scope of the appended claims.

I claim:

1. A fluid magnetic clutch mechanism comprising, in combination with a casing, a power input shaft rotatably journaled on said casing and extending therein, a driving disc of magnetic material carried by said power input shaft, said disc having a cylindrical rim portion disposed concentrically of said input shaft and of relatively short axial extent compared thereto, electro-magnetic coil means carried by said input shaft, a cage member of magnetic material carried by said input shaft and enclosing said coil means, said cage member including a circular plate carried by said input shaft adjacent the end of said coil means remote from said disc and a cylindrical sleeve carried by said plate and extending concentrically of said input shaft, said sleeve extending beyond said coil means and encircling the rim of said disc and having an end extending beyond said disc, said disc having a diameter slightly less than the bore of said sleeve to provide an annular air gap therebetween, a circular flux barrier member of nonmagnetic material extending from said input shaft to said sleeve between said disc and said coil means, an adaptor member rotatably journaled in said casing and connected to said end of said sleeve, a power output shaft rotatably journaled on said casing and in said adaptor member to extend coaxially with said input shaft, said output shaft carrying a cup-shaped rotor having a cylindrical portion extending concentrically of said shaft into said air gap to be substantially coextensive with the rim portion of said disc, a mixture of lubricant and comminuted paramagnetic particles disposed within said air gap, and means for controllably energizing said coil means whereby to generate magnetic flux following paths intersecting said air gap.

2. A fluid magnetic clutch mechanism comprising, a rotatable power input shaft, a driving disc of magnetic material carried by said power input shaft, said disc having a cylindrical rim portion disposed concentrically of said input shaft and of relatively short axial extent compared thereto, electro-magnetic coil means carried by said input shaft, a cage member of magnetic material carried by said input shaft and enclosing said coil means, said cage member including a circular plate carried by said input shaft adjacent the end of said coil means remote from said disc and a cylindrical sleeve carried by said plate and extending concentrically of said input shaft, said sleeve extending beyond said coil means and encircling the rim of said disc, said disc having a diameter slightly less than the bore of said sleeve to provide an annular air gap therebetween, a circular flux barrier member of nonmagnetic material extending from said input shaft to said sleeve between said disc and said coil means, a rotatable power output shaft disposed coaxially with said input shaft, said output shaft carrying a cup-shaped rotor having a cylindrical portion extending concentrically of said shafts into said air gap to be substantially coextensive with the rim portion of said disc, a mixture of lubricant and comminuted paramagnetic particles disposed within said air gap, and means for controllably energizing said coil means whereby to generate magnetic flux following paths intersecting said air gap, said rim of said disc being laterally offset to approximately balance the lateral components of the magnetic forces between the disc rim portion and the cylindrical rotor portion.

3. A fluid magnetic clutch mechanism comprising, in combination with a casing, a power input shaft rotatably journaled on said casing and extending therein, a magnet core coupled to said input shaft and having a driving disc of magnetic material at its inner end disposed coaxially of said input shaft, said disc being of relatively short axial extent compared to said core, electro-magnetic coil means wound about said core, a cage member of magnetic material carried by said core and disposed to enclose said coil means, said cage member including an end wall portion at the end of said coil means remote from said disc and a cylindrical sleeve portion carried by said end wall portion and extending concentrically of said core, said sleeve portion having an end portion encircling said disc in slightly radially spaced relation therewith and extending therebeyond whereby to provide an annular air gap between said disc and said sleeve end portion, mounting means journaled in said casing and rotatably mounting said sleeve end portion, flux barrier means extending from said core to said sleeve portion in sealed relation therewith between said coil means and said disc, a power output shaft rotatably journaled on said casing and having a cylindrical rotor portion extending concentrically of said shafts and into said air gap, the peripheral surface of said cylindrical rotor portion being substantially coextensive in axial direction with the peripheral surface of said disc, a mixture of fluid vehicle and comminuted paramagnetic particles disposed within said air gap, fluid seal means extending from said output shaft to said sleeve end portion mounting means adjacent said rotor, and means for controllably energizing said coil whereby to generate magnetic flux following a path intersecting said air gap.

References Cited in the file of this patent

UNITED STATES PATENTS

| Number | Name | Date |
|---|---|---|
| 758,768 | Mohlenhoff | May 3, 1904 |
| 1,031,081 | Miram | July 2, 1912 |
| 1,169,937 | Dikeman | Feb. 1, 1916 |
| 1,515,869 | Moyer | Nov. 18, 1924 |
| 1,721,592 | Gattrell | July 23, 1929 |
| 2,106,958 | Pettit, Jr. | Feb. 1, 1938 |
| 2,120,734 | Cotal | June 14, 1938 |
| 2,180,470 | Jaeger et al. | Nov. 21, 1939 |
| 2,232,789 | Kollsman | Feb. 25, 1941 |
| 2,470,103 | Lochman | May 17, 1949 |
| 2,488,079 | De Levand et al. | Nov. 15, 1949 |
| 2,488,827 | Pensahene | Nov. 22, 1949 |
| 2,505,500 | Milde | Apr. 25, 1950 |
| 2,519,449 | Findley | Aug. 22, 1950 |
| 2,525,571 | Winther | Oct. 10, 1950 |
| 2,573,065 | Salemme | Oct. 30, 1951 |

FOREIGN PATENTS

| Number | Country | Date |
|---|---|---|
| 485,591 | Belgium | Nov. 13, 1948 |

OTHER REFERENCES

A Servo Employing Magnetic Fluid Clutch; Review of Scientific Instruments, vol. 20, No. 2, February 1949.

National Bureau of Standards Technical Report 1213.

News items on "Magnetic Fluid Clutch," Washington "Evening Star," March 26, 1948.